Figure 1:
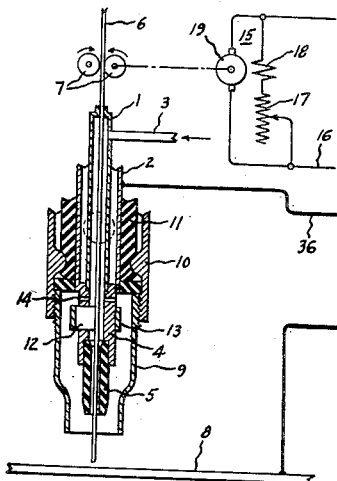
Figure 1:
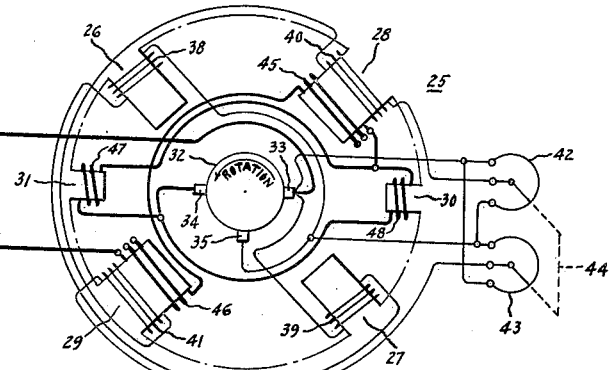

June 1, 1954

R. W. TUTHILL ET AL 2,680,181

ARC WELDING

Filed June 26, 1952

GENERATOR WITH RISING
VOLT-AMPERE CHARACTERISTIC.

Inventors:
Roger W. Tuthill,
Alanson U. Welch, Jr.,
by
Their Attorney.

Patented June 1, 1954

2,680,181

UNITED STATES PATENT OFFICE 2,680,181

ARC WELDING

Roger W. Tuthill, Fitchburg, and Alanson U. Welch, Jr., West Townsend, Mass., assignors to General Electric Company, a corporation of New York Application June 26, 1952, Serial No. 295,612

12 Claims. (Cl. 219—8)

Our invention relates to metal arc welding at current densities sufficiently high to produce a self-regulating arc. More particularly our invention relates to this type of welding wherein the arc is shielded from the surrounding atmosphere as in shielded inert gas metal arc welding.

In shielded inert gas metal arc welding as usually practiced, a spray deposit of weld metal in an atmosphere of argon or helium or a mixture of these gases is obtained by feeding a small diameter electrode at a substantially constant high rate of speed while supplying current thereto and to the arc at high densities. At a certain minimum current density which varies with both the electrode size and material, metal transfer through the arc changes from very large globular drops, which fall off the end of the electrode, to a spray of extremely fine droplets, which is projected from the end of the electrode in the direction in which the electrode is pointed.

To secure the desired high current densities in this type of welding, the electrode with normally used welding-current sources is usually less than $\frac{3}{32}$ inch in diameter. Current densities of from 40,000 to 180,000 amperes per square inch or higher are used for electrodes of from .025 to .093 inch in diameter. This high current density in the electrode wire results in a very rapid consumption thereof and consequently, the wire must be fed at a high rate of speed to match its consumption or burn-off rate in the arc. For example, when welding a ⅛ inch aluminum plate with an aluminum electrode of .040 inch in diameter in an atmosphere of argon supplied at 60 cubic feet per hour, and with a welding current value of 185 amperes, the feeding rate of the electrode is about 350 inches per minute to establish satisfactory operating conditions.

Consumption of the electrode in this type of arc welding is almost directly proportional to the current and is not very sensitive to the arc voltage. When a proper arc is established, it is automatically maintained by current supplied from the conventional direct current welder having a drooping volt-ampere characteristic. Usually, the electrode is connected to the positive terminal of the generator and the work is connected to the negative terminal thereof. The inherent self-regulation of the welding arc in this process of welding makes this process essentially automatic and eliminates controls for varying the speed of electrode feed in accordance with a characteristic of the arc such as its current or voltage.

It has also been suggested in this form of welding to supply the welding current from a generator having an output voltage which is substantially constant regardless of load. With such a generator or with the more often used conventional generator having a drooping volt-ampere characteristic, the self-regulating character of the arc results from a compensating change of its arc length for changes in electrode feed rate or changes in arc current for the same feed rate. As will be pointed out in greater detail below, this behavior of the arc is due to its volt-ampere characteristics at different arc gaps. These arc characteristics have positive slopes and vary with arc length, the characteristic for a long arc being at a higher voltage for the same current than for a short arc.

We have determined that there is a critical arc length and voltage, or a narrow band thereof, below which welding by this process occurs with a great number of short circuits and above which virtually no short circuits occur. If welding is accomplished above this critical voltage or band of critical voltage, good spray type transfer of electrode metal will result with very little spatter, the arc will have good forceful action, and welds will be produced which have good appearance and good X-ray qualities. It is our observation that the narrow band of critical voltage is from 1½ to 2 volts in width.

Short circuits occurring below this critical operating voltage are the direct result of droplets from the arcing end of the electrode producing short circuits to the work and causing high currents to flow momentarily with a blasting effect resulting in spatter. The change in arc length, with generators heretofore used in this type of welding, may throw operation from the smooth spray type of arc to a rough fluctuating arc characterized by frequent intervals of short circuit causing excessive spatter along the weld. Also experience has shown that the operation of this process with a drooping voltage welder is very critical. Unless the current and electrode feed speed are very closely matched, the arc length is either so short as to force the operator to back the welding tool away from the work to avoid stubbing, or lengthens so rapidly as to cause arc flashing to the welding tool with consequent destruction of the nozzle thereof. If the open circuit voltage of the conventional drooping volt-ampere characteristic generator is made less than twice the arc voltage, some improvement is obtained since greater changes in arc current are obtained for the same change in arc voltage. Still better results may be obtained with a generator having substantially the same voltage output regardless of load. However, in each case changes in electrode feed rate is productive of changes in arc length which may fall below the critical voltage and result in unsatisfactory welding conditions.

It is an object of our invention to provide a method of self-regulating metal arc welding and apparatus therefor which provides for an adjustment of the welding current without producing a change in arc length by simply adjusting the speed of electrode feed.

It is also an object of our invention to provide a method and apparatus for this kind of welding in which the arc length adjustment may be made without a change in the welding current by simply changing the voltage adjusting means of the source of welding current.

Further objects of our invention will appear from the following description thereof.

We accomplish these objects by supplying welding current for the establishment of a self-regulating metal arc from a generator or other source having a net rising volt-ampere characteristic of substantially the same form as the rising volt-ampere characteristic of the arc. When such arc is at a length which is above the critical voltage, operation proceeds without frequent short circuits due to molten particles bridging the physical gap between the electrode and the work. The more nearly the volt-ampere characteristic of the source, as evident at the terminals of the arc, corresponds to the volt-ampere characteristic of a self-regulating arc of a predetermined desired length, the more nearly will the arc be held at this length during welding operations. With such a welding current source, welding current can be adjusted by simply adjusting the speed of electrode feed. Furthermore, the arc length can be independently adjusted for a given electrode size by simply adjusting the voltage of the source which will move its characteristic curve up and down relative to the various volt-ampere curves of arcs of different lengths for operation along a selected one of these curves. Segregation of the control into its functions of one control for arm length and one control for current and metal deposition rate, the latter being only an adjustment of electrode feed speed, makes the welding operation very simple and practically foolproof. The arc length is no longer sensitive to variations of welding current or electrode feed speed when welding in accordance with our invention.

Figure 2:
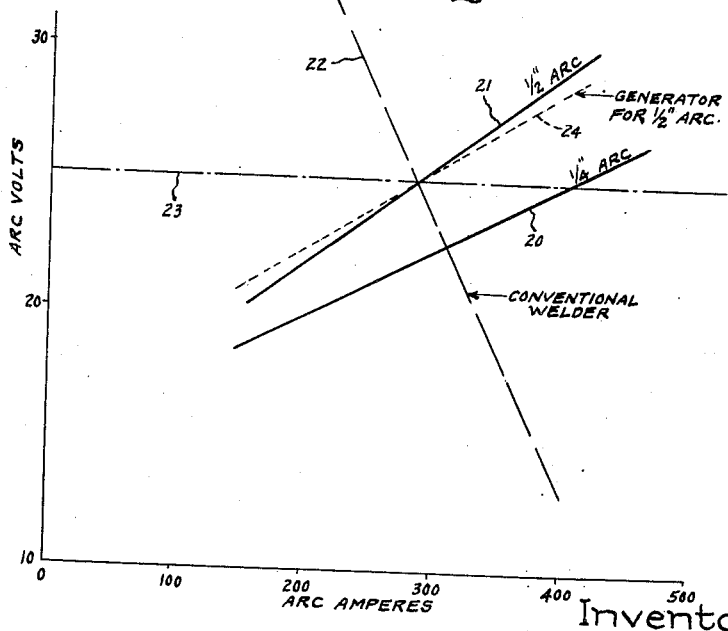

The features of our invention which we believe to be novel are set forth with particularity in the appended claims. The following more complete description of our invention may best be understood by reference to the accompanying drawing in which Fig. 1 is a more or less diagrammatic representation of apparatus in accordance with one embodiment thereof and Fig. 2 is a diagram or sketch showing the relationship of certain volt-ampere characteristics of the welding arc for two different arc lengths to a preferred volt-ampere characteristic of the generator employed in accordance with one embodiment of our invention. Fig. 2 also shows the relationship of the volt-ampere characteristics of generators heretofore employed relative to the volt ampere characteristics for the same two arcs of different lengths.

In Fig. 1 of the drawing we have illustrated apparatus suitable for performing shielded inert gas metal arc welding in accordance with one embodiment of our invention. This apparatus comprises a welding tool and a welding generator having its output terminals connected to the work and to this tool for supplying welding current to an arc established between the work and an electrode in the tool. The generator of this embodiment is of particular design in that it has an output volt-ampere characteristic which is tangent or nearly tangent to the rising volt-ampere characteristic of the shielded inert gas metal welding arc. Satisfactory operation will be obtained in accordance with this embodiment of our invention if the volt-ampere characteristic of the generator, as evident at the electrode and the work, is of substantially the same form as the volt-ampere characteristic of the welding arc. The ideal condition is to have the machine overall-volt-ampere curve coincident with the arc volt-ampere curve since with this operating condition the arc current can be forced from a very high value to a very low value, or the reverse, by simply changing the electrode feeding speed without thereby producing any change in the arc length.

The welding tool may be a machine tool which positions the arcing terminal of the electrode relative to the work and traverses it along a desired line of welding at a desired speed. More often, in this type of welding, it is a hand tool which may be manipulated by the welding operator. Such a hand tool is usually referred to as a welding gun. In either case the welding tool provides means for directing the electrode through a nozzle which supplies the shielding gas. Current is supplied to the electrode near its arcing terminal from one terminal of the welding generator and means are also provided for feeding the electrode at a substantially constant high rate of speed. When a hand tool or welding gun is employed, the current, gas, and electrode supply channels are made flexible to permit easy manipulation of the gun during welding. In some instances, where the electrode feed rolls are embodied in the gun, they are connected by a flexible drive shaft with the feed motor which is located with the gas, current, and electrode supplies at a point remote from the gun.

The welding tool of Fig. 1 of the drawing is a representation of a hand tool more fully illustrated and described in an application for United States Letters Patent Serial No. 253,282, filed October 26, 1951, for Arc Welding Apparatus, in the name of Alanson U. Welch, Jr., one of us, and assigned to the same assignee as this invention.

The welding tool shown in Fig. 1 comprises an electrode guide formed by concentrically spaced tubes 1 and 2. A conduit 3 enters the upper end of tube 1 for supplying shielding gas thereto. The lower ends of tubes 1 and 2 terminate in an adapter 4 which closes the space between the inner and outer tubes and provides a continuation of the electrode and gas passageway in tube 1. A socket in the lower end of the adapter 4 provides a support for a replaceable tip 5. The fusible metal electrode 6 is propelled by feed rolls 7 into and through tube 1, adapter 4 and tip 5 in its passage through the tool toward the work 8. The adapter 4 and tip 5 are enclosed within a nozzle 9 which is supported on the lower end of a sleeve 10 which frictionally engages and is supported by a resilient sleeve 11 which in turn frictionally engages and is supported by the lower end of tube 2 of the electrode guide. Tubes 1 and 2 of the electrode guide and two longitudinal partitions therebetween form supply and exhaust passageways for cooling fluid which is also circulated between sleeve 10 and sleeve 11 through matching holes in the lower end of tube 2 and sleeve 11. Welding current is supplied to electrode 6 through a brush 12 which is supported in the adapter 4 and spring-biased into engagement with the electrode by spring ring 13. The brush 12, adapter 4 and tubes 1 and 2 are formed of metal which is a good electrical conductor and one terminal of the welding generator is connected at a suitable point to tube 2 for supplying welding current to brush 12 and thence to electrode 6. Gas supplied to the inner tube 1 of the electrode guide passes through this tube to discharge passages 14 in the adapter 4 and into the upper end of the chamber formed by nozzle 9. This gas is discharged through the open end of nozzle 9 to form a shield about the arcing terminal of the electrode and the molten metal in the work 8 formed by the welding arc. As shown in Fig. 1, the work 8 is connected to the other terminal of the welding generator.

The electrode 6 is fed through the welding tool at a substantially constant high rate of speed by means of a feed motor 15. As illustrated, this motor is a direct current shunt motor having its input terminals connected to a suitable source of direct current 16. The speed of this motor can be set or adjusted by adjusting a rheostat 17 in circuit with its shunt field 18. The armature 19 of this motor is mechanically connected to one or both of the feed rolls 7 of the welding tool which engage and propel electrode 6 through the welding tool. When welding with current supplied from the conventional direct current generator having a drooping volt-ampere characteristic the speed of electrode feed is adjusted so that its fusion or burn-off rate in the arc will produce an arc of desired length. This also requires a concurrent adjustment of the welding generator to secure operation on that characteristic curve thereof which will supply the necessary fusing current at this desired operating voltage of the welding arc.

The conventional arc welding generator having a drooping volt-ampere characteristic reduces its voltage with increase of current until it approaches zero at some finite current. When adjusted to operate on a certain volt-ampere curve, the output of the generator is always on this curve. The generator may, however, be adjusted to operate on any one of a family of curves selected according to a selected adjustment of the welding generator. Assume operation on a characteristic curve of this generator such that the welding current and voltage results in a fusion or burn-off rate of the electrode which matches its feeding rate and secures the desired deposit of electrode material through the arc. If, for any reason, the electrode feeding rate is increased over these equilibrium conditions, the welding operation will proceed along this generator characteristic to a point of increased current and reduced voltage. The increased current flow results in a faster burn-off of the electrode because its consumption is almost directly proportional to the arc current and is not very sensitive to arc voltage. This increased burn-off rate due to increased current may match the increased feeding speed and if it does, a new stable condition will result. If, on the other hand, the electrode feeding speed were reduced below initial stable equilibrium conditions, the arc current would consume more electrode than was being supplied to the arc and consequently, the arc would get longer. Stability would then occur at a higher voltage where the current produced would just melt off the electrode at the new rate of supply to the arc. If, however, the wire feeding speed were held constant and the generator characteristic adjusted to give higher or lower current values, the arc voltage would increase or decrease to new values productive of the same initial fusing current which matched burn-off rate of the electrode with the constant rate of electrode feed. Sometimes, due to generator heating, and the resulting change to a lower output characteristic of the generator, the arc length may become so short that drops of molten metal will short circuit it causing spatter. Furthermore, the current may fall to such a low value, due to this heating effect, that with an initially satisfactory setting for a given electrode feeding rate, the generator is unable to produce enough current to match burn-off rate against feeding rate of the electrode with the result that the electrode will plunge into the work and freeze.

Starting the arc in this type of welding can be accomplished by pulling a trigger of the welding gun to initiate feeding of the electrode and simultaneously to complete the electric circuit from the generator to the electrode and the work. Starting is not always easily accomplished, since the characteristic of the machine has a great deal to do with the ease of starting. If the welding characteristic of the machine is chosen where the volt-ampere characteristic is fairly steep, the short circuit current obtained is not large enough to initiate the arc and to establish molten fusing conditions on the end of the electrode quick enough to prevent the electrode from being forced into the metal in an unmolten state and freezing. It is essential consequently to choose a volt-ampere curve of such a value as to be able to produce considerable short circuit current compared to the current obtained during welding conditions.

It has been suggested that a substantially constant voltage from no load to full load be applied to the arc from a direct current generator having a voltage equal to or slightly higher than the arc voltage. Such a generator will facilitate arc starting but will produce changes in arc length in accordance with changes of current required to establish desired current flows or changes in feeding rate of the electrode. This follows as a direct result of the volt-ampere characteristics of the welding arc. These characteristics have positive slopes which vary with arc length for a given size electrode, the characteristic for a long arc being at a higher voltage for the same current than for a short arc.

In Fig. 2 of the drawing we have illustrated at 20 and 21 the volt-ampere characteristics for ¼ inch and ½ inch arcs established in an argon atmosphere between a 3/32 inch diameter aluminum electrode and a plate of aluminum with the electrode at positive polarity. It will be noted that each of these curves has a positive slope and that the characteristic for the ½ inch arc has a slope which is more positive than that for the ¼ inch arc. We have also indicated in Fig. 2 at 22 a steep dashed curve marked "Conventional Welder" which is an approximation of the volt-ampere curve of an ordinary drooping characteristic direct current arc welder. It will be seen that this intersects the ½ inch arc curve at 25 volts for 280 amperes. It will also be evident that a slight change of arc current of from 280 to 305 amperes on this same machine curve would shorten the welding arc from ½ inch to ¼ inch, or wording this another way, if the electrode feeding device should speed up slightly it would halve the length of the welding arc changing the arc amperes and burn-off rate very slightly.

The difference between the ½ and ¼ inch arc lengths is very substantial in this type of welding and may throw the operation from the smooth spray type of arc operation to a rough fluctuating arc characterized by frequent intervals of short circuit causing excessive spatter along the weld. Also, experience has shown that the operation of this process with a conventional welder is very critical. Unless the current and the wire feeding speed are very closely matched, the arc length is either so short as to force the operator to back the welding gun away to avoid stubbing or lengthens so rapidly as to cause arc-flashing to the gun with consequent destruction of the welding gun nozzle.

It will also be seen from the sketch of Fig. 2 that if we were to use a generator with output voltage constant, regardless of load, as shown by the characteristic curve 23, conditions would be substantially improved. For example, the arc current would have to increase from 280 to 400 amperes to obtain a change from the ½ inch to the ¼ inch arc length. This large change of current would compensate for a fairly large change of wire feeding speed. However, this is not the ideal operation which is obtained in accordance with our invention by using a generator having a rising volt-ampere characteristic with increasing load. Preferably the arrangement should be such that the net voltage at the welding arc increases as volt-amperes increase, as shown by the dotted line 24 of Fig. 2. This line has been made nearly tangent to the arc volt-ampere curve in order that it become distinguishable therefrom. However, for most effective operation the machine overall volt-ampere curve should be coincident with the arc voltage-ampere curve, since with this condition the arc current can be forced from a very high value to a very low value, or the reverse, by changing the wire feeding speed without the arc departing from the ½ inch arc length shown.

Any suitable source of welding current supplied having a volt-ampere characteristic which, as evident at the electrode and the work, is rising and within the range of an increase of at least 5 volts between no load and full load up to an increase of voltage and current of substantially the same magnitude as the volt-ampere characteristic of the welding arc may be employed in practicing our invention. In Fig. 1 of the drawing we have shown a self-regulating generator which we have employed for this purpose. This welding generator 25 is of the split pole type illustrated and described in U. S. Letters Patent 1,340,004—Sven R. Bergman for Dynamo Electric Machine granted on May 11, 1920. It is to be understood, however, that the winding arrangement and excitation is modified from that shown in the patent so as to obtain the desired rising volt-ampere characteristic.

The self-regulating generator 25 of Fig. 1 is of the type that has been used for battery charging. It has an open circuit voltage adjustable from 10 to 35 volts. It may be adjusted to provide 10 volts no load and 35 volts full load which is within the range of adjustment employed in practicing our invention. It may be adjusted, however, to provide 35 volts no load with 10 volts full load in which case it has operating characteristics approximating those of the Bergman patent above referred to. It is of particular utility in the application we make of it in practicing our invention, since the field arrangement is such as to occasion very little field heating. Consequently, the differences between the hot and cold characteristics of the generator depend almost entirely on the differences between the cold and hot resistances of the output circuit including the armature conductors and the series field windings.

The physical structure and field winding arrangement of this self-regulating generator have been illustrated in the representation of this generator shown in Fig. 1. It comprises a field structure having main poles 26 and 27, cross poles 28 and 29, and commutating poles 30 and 31. Also it has an armature structure whose conductors terminate in a commutator 32 engaged by main brushes 33 and 34 and an auxiliary brush 35 located between these main brushes. One main brush 33 is connected to the electrode 6 through a conductor 36 and the other main brush 34 is connected through the series field windings and a conductor 37 to the work 8. The welding conductors 36 and 37 are of the usual type and for the lengths usually employed impose no more than a 1 to 5 volt resistance drop in the welding circuit. Consequently, the volt-ampere adjustment of the welding generator must be at the 1 to 5 volt higher value than that required by the volt-ampere characteristic of the welding arc. From the explanation previously given, it is of course apparent that the volt-ampere characteristic of the welding generator must be such that, as evident at the electrode and work, it is rising and within the range exceeding 5 volts between no load and full load up to substantial coincidence with the volt-ampere characteristic of the arc.

The main poles 26 and 27 of the generator 25 are provided with shunt field windings 38 and 39 which are connected in series with one another across main brush 33 and auxiliary brush 35. These windings provide a saturating flux for the main field windings so that armature reaction produces very little if any change in the field strength through pole pieces 26 and 27. Cross pole pieces 28 and 29 are provided with shunt field windings 40 and 41 which are connected in series with one another to the sliding contacts of a pair of rheostats 42 and 43. These sliding contacts are operated in unison by a linkage 44 so that an adjustment of one rheostat requires a corresponding adjustment of the other rheostat. The rheostats 42 and 43 are connected across the main brush 33 and auxiliary brush 35 so that movement of the contacts thereof depending upon their positions will supply current in one direction or the other through the cross field shunt windings 40 and 41. The cross pole pieces 28 and 29 are provided with series windings 45 and 46, which are connected in series with one another and in series with the parallel connected series windings 47 and 48 of the commutating pole pieces 30 and 31. The series field windings 45 and 46 for the cross pole pieces 28 and 29 are provided with taps so as to provide the different operating volt-ampere characteristics required by the operating volt-ampere characteristics of welding arcs of different lengths. It will also be noted that cross pole pieces 28 and 29 have been illustrated as having larger dimensions than the main pole pieces 26 and 27. This is to provide for operation of the cross pole pieces at flux values less than saturation.

In Fig. 2, the characteristics of the arc and of the generator or source of supply have, for convenience, been illustrated as straight lines. This will follow as a natural consequence of the fact that the arc plasma will act as a pure resistance in the operating range. Ordinarily, however, the generator characteristic will not be a straight line and for preferred operation, it will usually be possible to secure coincidence or near coincidence of the arc and generator characteristics only within a given range of operating current values. Consequently, the adjustment of the generator should be such that its characteristic and the arc characteristic are tangent to one another at the middle of the operating range of current values employed. Satisfactory results will be obtained if these two characteristics intersect one another at a sharp angle as shown in Fig. 2, where they intersect at an angle of about 5 degrees. When they do so intersect at a sharp angle, it is, of course, apparent that when the operating current deviates from the initially set value there will be some slight change in the operating length of the welding arc. This change, however, is quite small and is of minor consideration when compared with the voltage change that results when using a conventional generator having a decidedly drooping characteristic or when using a constant voltage generator having a voltage which remains substantially constant between no load and full load. Also, the change in arc length with heating up of the generator will likewise produce a minor change in the operating length of the welding arc but this change will not in any way approximate the magnitude of change that occurs when using the conventional welder having a decidedly drooping volt-ampere characteristic.

From what has been stated above it is quite apparent that when the rising characteristic curve of a generator in accordance with our invention is coincident or nearly coincident with the arc characteristic curve that the length of the welding arc will be held at a substantially constant arc length. With this arrangement the welding current can be adjusted by simply adjusting the speed of the electrode feed. The arc length can be independently adjusted for a given electrode size by simply changing the voltage adjusting rheostat of the generator, which will move its characteristic curve up and down to coincide with the various arc volt-ampere curves. Segregation of the control into its functions of one control for arc length and one control for current and metal deposition rate, the latter being only the adjustment of electrode feed speed, makes the operation very simple and practically foolproof. By employing the preferred embodiment of our invention the arc length is no longer sensitive to variations in welding current or wire feed speed as in arrangements heretofore proposed.

The sketch of Fig. 2 of the drawing shows the static or equilibrium volt-ampere characteristics of the power source. It might seem that the rising output curve of the generator employed in accordance with our invention would cause instability. However, our tests have indicated that this is not the case. We believe that the reason for this is that the dynamic characteristics of the generator are different from the static characteristics illustrated. These dynamic characteristics of the generator will become evident by considering an example thereof. If while welding at 280 amperes, 25 volts, $\frac{3}{32}$ inch wire and a ½ inch arc length, as shown in Fig. 2 of the drawing, the electrode feed were suddenly increased by turning the control knob, the first effect would be a momentary shortening of the welding arc. This would result in a momentary lower arc voltage and a substantial increase in current because for the first short time interval the internal generated voltage of the generator would not change. This increased current would drop the voltage at the welding arc because of the higher IR drop in the welding cables and generator armature. A fraction of a second later the effect of the series field windings in the generator would begin to appear in the generation of an increased voltage and the system would readjust itself to match the volt-ampere characteristic of the arc simultaneously as the arc length increased back to the ½ inch value. A like analysis can be made of the action resulting from suddenly decreasing the electrode feed speed.

The particular volt-ampere arc characteristics above considered are believed to be the direct result of the presence of metallic vapor in the arc. There appears to be very little difference in the effect of steel and aluminum vapor and although the characteristic arc curves of Fig. 2 are for an aluminum arc, these same curves can be taken as characteristic for any other metal arc. In determining these characteristics, however, it may be necessary to make some allowance for the voltage drop in electrodes having a high resistance value such as electrodes of stainless steel. It is also apparent that with different atmospheres about the arc the rising characteristic of the arc will vary. Thus, for an aluminum arc in a helium atmosphere, the curve is at a higher voltage characteristic of the higher voltage of an arc in helium. The characteristic of the arc will also change with the size of electrode employed. Thus, for a $\frac{1}{16}$ inch aluminum arc in argon the voltage values will be higher for the same arc gap and current values.

In direct current welding, either straight or reverse polarity may be used in practicing our invention. With straight polarity in argon for example, it is possible to obtain higher rates of metal deposition for the same welding current amperage than with reverse polarity. However, when the electrode is negative it is often necessary to operate at higher current densities than desired for the type of welding being performed. It has been found that welding may be obtained at lower current densities with straight polarity by adding a small amount of oxygen to the argon. The addition of oxygen to argon has little effect on the rate of metal transfer when welding with reverse polarity, electrode positive. For certain kinds of welding there is also an upper limit of current values that may be used when oxygen is present in argon. Thus, with aluminum, oxide folds form at the higher current values.

Although for most welding we believe that best results are obtained with an arc long enough to avoid frequent intervals of short circuit, we do not intend to be limited to such operation in practicing our invention. Whether or not short circuiting is a factor, it is still desirable to be able to maintain arc length steadily, which the rising volt-ampere characteristic generator of our invention accomplishes.

While we have particularly described our invention as applied to shielded inert gas metal arc welding where it is expected to find its greatest utility, it is to be understood that it may be applied to any form of metal arc welding wherein the arc has the same self-regulating or self-compensatory action. For example, it is applicable to welding in air, although as expected, a dirty or oxidized weld is obtained because of the absence of a shielding medium. Other shielding mediums beside inert gases may be employed. We do not preclude the use of solid or liquid shielding mediums, such, for example, as the granular fluxes heretofore used in submerged melt welding.

Thus, while we have described our invention with regard to shielded inert gas metal arc welding, modifications and adaptations thereof will readily occur to those skilled in the art. It is consequently our intention to cover all changes and modifications of the example of our invention herein chosen for purposes of disclosure which do not constitute departures from the spirit and scope of our invention. We consider our invention to be broad in scope and it should not be limited in any sense except as defined by the following claims.

What we claim as new and desire to secure by Letters Patent of the United States is:

1. The method of welding with a self-regulating metal arc established between a fusible electrode and the work which comprises energizing the welding arc from a source of supply having a rising volt-ampere characteristic within the range of a voltage increase of at least 5 volts between no load and full load up to an increase of voltage with current of substantially the same magnitude as in the rising volt-ampere characteristic of said self-regulating arc when operating at a predetermined arc gap within the desired welding current range for a fusible electrode of predetermined size, establishing an arc between the work and said fusible electrode and feeding said fusible electrode to the work at a substantially constant rate of speed in accordance with its consumption in the arc for a predetermined welding current flow, and controlling the rate of metal deposition from said electrode during welding by adjusting the constant feeding rate of said electrode in order to adjust the welding current flow from said source of supply within said range of desired welding current.

2. The method of welding with a self-regulating metal arc established between a fusible electrode and the work which comprises energizing the welding arc from a source of supply having a rising volt-ampere characteristic of substantially the same slope as the rising volt-ampere characteristic of said self-regulating arc when operating at a predetermined arc gap within the desired welding current range for a fusible electrode of predetermined size, establishing an arc between the work and said fusible electrode and feeding said fusible electrode to the work at a substantially constant rate of speed in accordance with its consumption in the arc for a predetermined welding current flow, and controlling the rate of metal deposition from said electrode during welding by adjusting the constant feeding rate of said electrode in order to adjust the welding current flow from said source of supply within said range of desired welding current.

3. The method of welding with a self-regulating metal arc established between a fusible electrode and the work which comprises energizing the welding arc from a source of supply having substantially the same rising volt-ampere characteristic as said self-regulating arc when operating within the desired welding current range for said fusible electrode of predetermined size, adjusting the voltage of said source to establish between said fusible electrode and the work a predetermined arc gap, establishing an arc between the work and said electrode and feeding said fusible electrode to the work at a substantially constant rate of speed in accordance with its consumption in the arc for a predetermined welding current flow, and controlling the rate of metal deposition from said electrode during welding by adjusting the constant feeding rate of said electrode in order to adjust the welding current flow from said source of supply within said range of desired welding current.

4. The method of shielded inert gas metal arc welding with a fusible electrode conducting welding current at densities sufficient to produce a spray type deposit through the arc, said method comprising energizing the welding arc from a source of supply having a rising volt-ampere characteristic within the range of a voltage increase of at least 5 volts between no load and full load up to an increase of voltage with current of substantially the same magnitude as in the rising volt-ampere characteristic of said self-regulating arc when operating at a predetermined arc gap within the desired welding current range for a fusible electrode of predetermined size, establishing an arc between the work and said fusible electrode in a shielding atmosphere of gas selected from the group of argon, helium and mixtures thereof, feeding said fusible electrode to the work at a substantially constant rate of speed in accordance with its consumption in the arc for a predetermined welding current flow, adjusting the voltage of said source to establish between said fusible electrode and the work a predetermined arc gap which will prevent droplets of molten metal discharged from the fusible end of said electrode from short circuiting said gap when operating within said desired welding current range, and controlling the rate of metal deposition from said fusible electrode during welding by adjusting the constant feeding rate of said electrode in order to adjust the welding current flow from said source of supply within said range of desired welding current.

5. The method of shielded inert gas metal arc welding with a self-regulating metal arc established between the work and a fusible electrode conducting welding current at densities sufficient to produce a spray type deposit through the arc, said method comprising energizing the welding arc from a source of supply having substantially the same rising volt-ampere characteristic as said self-regulating arc when operating within the desired welding current range for an electrode of predetermined size, adjusting the voltage of said source to establish between said fusible electrode and the work a predetermined arc gap which will prevent droplets of molten metal discharged from the fusible end of said electrode from short circuiting said gap when operating within said desired welding current range, establishing an arc between the work and said fusible electrode in a shielding atmosphere of gas selected from the group of argon, helium and mixtures thereof, feeding said fusible electrode to the work at a substantially constant rate of speed in accordance with its consumption in the arc for a predetermined welding current flow, and controlling the rate of metal deposition from said fusible electrode during welding by adjusting the constant feeding rate of said electrode in order to adjust the welding current flow from said source of supply within said range of desired welding current.

6. Apparatus for metal arc welding with a self-regulating arc having a rising volt-ampere characteristic determined by its arc length, said apparatus comprising means for feeding an electrode at a substantially constant rate of speed, means for adjusting said substantially constant feeding rate of said last mentioned means, and means for supplying welding current to said electrode and the work at current densities in said electrode sufficiently high to produce a self-regulating arc, said means having a volt-ampere characteristic which, as evident at the electrode and the work, is rising and within the range of an increase of at least 5 volts between no load and full load up to an increase of voltage with current of substantially the same magnitude as in the volt-ampere characteristic of said welding arc when operating at a predetermined arc length.

7. Apparatus for metal arc welding with a self-regulating arc having a rising volt-ampere characteristic determined by its arc length, said apparatus comprising means for feeding an electrode at a substantially constant rate of speed, means for adjusting said substantially constant feeding rate of said last mentioned means, means for supplying welding current to said electrode and the work at current densities in said electrode sufficiently high to produce a self-regulating arc, said means having a volt-ampere characteristic which, as evident at the electrode and the work, is rising and within the range of an increase of at least 5 volts between no load and full load up to an increase of voltage with current of substantially the same magnitude as in the volt-ampere characteristic of said welding arc when operating at a predetermined arc length, and means for adjusting the volt-ampere characteristic of said welding current supply means.

8. Apparatus for metal arc welding with a self-regulating arc having a rising volt-ampere characteristic determined by its length, said apparatus comprising means for feeding an electrode at a substantially constant rate of speed, means for adjusting said substantially constant feeding rate of said last mentioned means, and means for supplying welding current to said electrode and the work at current densities in said electrode sufficiently high to produce a self-regulating arc, said means having a volt-ampere characteristic which, as evident at the electrode and the work, is rising and for the desired welding current range of substantially the same slope as the volt-ampere characteristic of said welding arc when operating at a predetermined arc length.

9. Apparatus for metal arc welding with a self-regulating arc having rising volt-ampere characteristics each of which is different for different arc lengths, said apparatus comprising means for feeding an electrode at a substantially constant rate of speed, means for adjusting said substantially constant feeding rate of said last mentioned means, means for supplying welding current to said electrode and the work at current densities in said electrode sufficiently high to produce a spray type of deposit from the arcing tip of said electrode, said means having a volt-ampere characteristic which, as evident at the electrode and the work, is rising and for the desired welding current range of substantially the same slope as the volt-ampere characteristic of said welding arc when operating at a predetermined arc length, and means for adjusting the operating voltage of said welding current supply means.

10. Apparatus for metal arc welding with a self-regulating arc having rising volt-ampere characteristics each of which is different for different arc lengths, said apparatus comprising means for feeding a fusible electrode at a substantially constant rate of speed, means for adjusting said substantially constant feeding rate of said last mentioned means, a direct current generator for supplying welding current to said electrode and the work, said generator having a volt-ampere characteristic which, as evident at the electrode and the work, is rising and of substantially the same slope as the volt-ampere characteristic of said welding arc when operating at a predetermined arc length, low resistance leads connecting one terminal of said generator to said electrode and the other terminal of said generator to the work, and means for adjusting the operating voltage of said generator.

11. Apparatus for shielded inert gas metal arc welding with a fusible electrode conducting welding current at densities sufficient to produce a spray type deposit through the arc, said apparatus comprising a source of welding current having substantially the same rising volt-ampere characteristic as said self-regulating arc at different arc gaps and voltages when operating within the desired welding current range with electrodes of different sizes, means for adjusting the voltage of said source for the same welding current range, means for establishing about the arcing terminal of said arc and the molten portions of the work a shielding atmosphere of gas selected from the group of argon, helium and mixtures thereof, means for feeding said fusible electrode to the work at a substantially constant rate of speed in accordance with its consumption in the arc for a predetermined electrode size and welding current, and means for adjusting the constant feeding rate of said electrode feeding means.

12. Apparatus for shielded inert gas metal arc welding with a self-regulating arc having rising volt-ampere characteristics each of which is different for different arc lengths, said apparatus comprising means for feeding a fusible electrode at a substantially constant rate of speed, means for adjusting said substantially constant feeding rate of said last mentioned means, means for supplying about the arcing terminal of said electrode and the molten portions of the work, a shielding gas selected from the group consisting of argon, helium and mixtures thereof, a direct current generator for supplying welding current to said electrode and the work, said generator having a volt-ampere characteristic which, as evident at the electrode and the work, is rising and of substantially the same slope as the volt-ampere characteristic of said welding arc when operating at a predetermined arc length and within a predetermined welding current range, low resistance leads connecting one terminal of said generator to said electrode and the other terminal of said generator to the work, and means for adjusting the operating voltage of said generator.

References Cited in the file of this patent

UNITED STATES PATENTS

| Number | Name | Date |
|---|---|---|
| 1,340,004 | Bergman | May 11, 1920 |
| 1,483,612 | Morton | Feb. 12, 1924 |
| 2,332,950 | Tannheim | Oct. 26, 1943 |
| 2,504,868 | Muller et al. | Apr. 18, 1950 |
| 2,532,410 | Kennedy | Dec. 5, 1950 |